B. W. COOK.
MILK PAIL STRAINER.
APPLICATION FILED APR. 26, 1913.
1,070,415.
Patented Aug. 19, 1913.
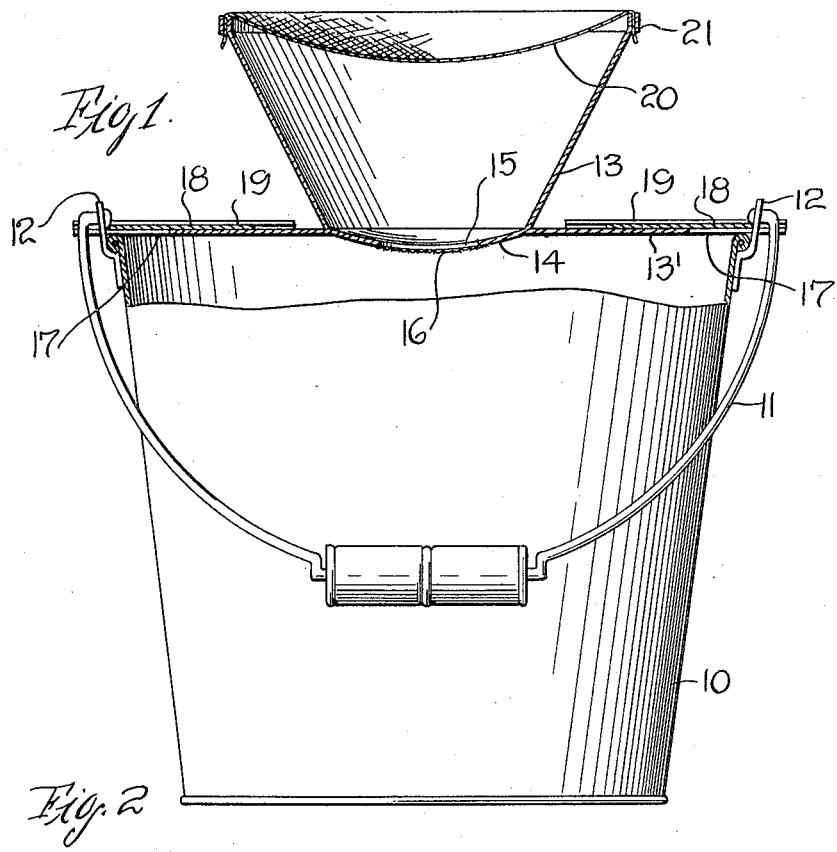
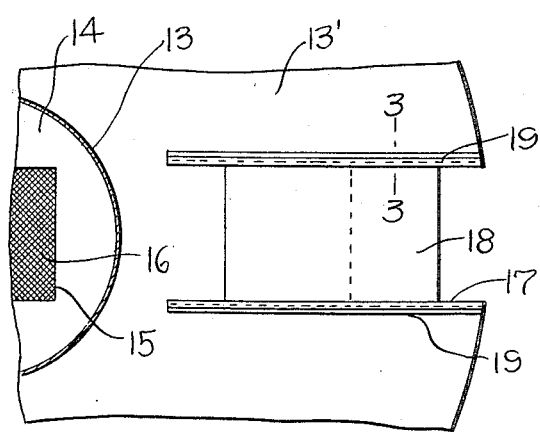
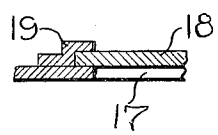
Inventor
B. W. Cook
Witnesses
Robert M. Sutphen
A. I. Hind
By Watson E. Coleman
Attorney

UNITED STATES PATENT OFFICE.

BENJAMIN W. COOK, OF MIDLAND, MICHIGAN.

MILK-PAIL STRAINER.

1,070,415.  Specification of Letters Patent.  Patented Aug. 19, 1913.

Application filed April 26, 1913. Serial No. 763,858.

*To all whom it may concern:*

Be it known that I, BENJAMIN W. COOK, a citizen of the United States, residing at Midland, in the county of Midland and State of Michigan, have invented certain new and useful Improvements in Milk-Pail Strainers, of which the following is a specification, reference being had to the accompanying drawings.

This invention relates to strainers for milk pails and has for an object to provide primarily a strainer which may be applied to various sizes of milk pails and which may be easily cleaned and kept sanitary.

A further object is to provide a strainer having openings to receive the bail ears of a milk pail whereby the ears serve to prevent displacement of the strainer during the milking operation.

A still further object is to provide a device of this character which may be manufactured at minimum cost, and will be formed of a few simple parts that will not easily get out of order.

With the above objects in view the invention consists of certain novel details of construction and combination of parts hereinafter fully described and claimed, it being understood that various modifications may be made in the minor details of construction within the scope of the appended claims.

In the accompanying drawing illustrating this invention: Figure 1 is a longitudinal sectional view showing the application of my invention. Fig. 2 is a fragmentary plan view showing one of the slides. Fig. 3 is a cross sectional view on the line 3—3 Fig. 2.

Referring now to the drawing in which like characters of reference designate similar parts, 10 designates an ordinary milk pail having a bail 11 attached to bail ears 12 carried at opposite points on the pail rim.

The strainer comprises a funnel consisting of a cylindrical side wall 13 and a concaved bottom 14 that is provided centrally with an outlet opening 15 over which is stretched a straining element 16, of any preferred type. The bottom is provided at opposite points in the edge with radial oblong openings 17 that are normally closed by oblong slides 18 which fit in longitudinal guides 19. The slides may be moved inwardly to any desired extent in order to permit of the strainer being applied to milk pails of various sizes, the bail ears of the milk pail being received in the openings 17 and anchoring the strainer against displacement during the milking operation.

A fabric straining element 20 is stretched over the rim of the strainer and is marginally clamped to the outer face of the strainer side wall by means of a clamp ring 21. The milk first passes through this straining element and then through the straining element 16 whereby all foreign matter is removed from the milk.

By manually removing the clamp ring, the fabric straining element may be removed and the various parts of the strainer thus disassembled may be readily cleansed to promote maintaining the strainer in a sanitary condition. It is obvious that by sliding the slides inwardly or outwardly on the strainer bottom the inner end portions of the openings 17 may be exposed to any suitable extent to receive the bail ears of pails of various sizes.

From the above description it will be seen that I have provided an extremely simple device of the character described which will be formed of a few parts that will not easily get out of order, and which will be effective in operation, and may be manufactured at minimum cost.

What is claimed, is:—

1. A milk strainer having milk pail ear receiving openings at opposite points in the bottom, and slides forming closures for said openings and adapted to be adjusted to expose any desired extent of the inner ends of said openings whereby the strainer may be applied to various sizes of milk pails.

2. A milk strainer including a side wall, a concaved bottom, there being openings at opposite points near the edge of said bottom for receiving the ears of a milk pail, and slides forming closures for said openings and adapted to be moved toward the center of said bottom whereby to expose any desired extent of the inner ends of said openings whereby the strainer may be applied to various sizes of milk pails.

3. A milk strainer including a side wall, a concaved bottom having a central discharge opening, a straining element disposed in said opening, there being radial substantially oblong openings formed at opposite points in the edge of said bottom for receiving the ears of a milk pail, and slides forming closures for said openings and adapted to be moved toward the center of said bottom whereby to expose any desired extent of the inner ends of said openings whereby the strainer may be applied to various sizes of milk pails.

4. A milk strainer including a side wall, a concaved bottom having central discharge openings, a fabric straining element stretched over the rim of said wall, a clamp ring clamping said straining element marginally to the outer face of said side wall, said bottom having milk pail ear receiving openings at opposite points near the edge, and slides forming closures for said openings and adapted to be adjusted to expose any desired extent of the inner ends of said openings whereby the strainer may be applied to various sizes of milk pails.

In testimony whereof I hereunto affix my signature in the presence of two witnesses.

BEN. W. COOK.

Witnesses:
MICHAEL W. RYAN,
C. A. MOSHER.

Copies of this patent may be obtained for five cents each, by addressing the "Commissioner of Patents, Washington, D. C."